(12) United States Patent
Monti

(10) Patent No.: US 7,775,381 B2
(45) Date of Patent: Aug. 17, 2010

(54) DEVICE FOR SUPPORTING BOTTLES

(75) Inventor: Giuseppe Monti, Pianoro (IT)

(73) Assignee: Marchesini Group S.p.A., Pianoro (Bologna) (IT)

( * ) Notice: Subject to any disclaimer, the term of this patent is extended or adjusted under 35 U.S.C. 154(b) by 902 days.

(21) Appl. No.: 11/616,703

(22) Filed: Dec. 27, 2006

(65) Prior Publication Data
US 2007/0164495 A1 Jul. 19, 2007

(30) Foreign Application Priority Data
Jan. 3, 2006 (IT) ............... BO06A0003

(51) Int. Cl.
*B65B 3/04* (2006.01)
(52) U.S. Cl. .................. 211/122; 211/74; 141/165; 141/369; 141/378; 53/300; 269/254 R
(58) Field of Classification Search ........... 141/165, 141/369, 378; 269/254 R; 211/74, 122; 53/300
See application file for complete search history.

(56) References Cited
U.S. PATENT DOCUMENTS

| 2,987,313 | A | * | 6/1961 | Bjering et al. ......... 269/254 R |
| 3,155,228 | A | * | 11/1964 | Norwood ................ 198/803.7 |
| 3,568,851 | A | | 3/1971 | Shafer |
| 3,601,951 | A | * | 8/1971 | Bargel et al. ............ 53/497 |
| 5,743,377 | A | * | 4/1998 | Kronseder ............ 198/803.9 |
| 5,778,633 | A | * | 7/1998 | Sweeny .................. 53/201 |
| 6,283,177 | B1 | * | 9/2001 | Naka et al. ............. 141/145 |
| 6,698,160 | B2 | * | 3/2004 | Peronek et al. ........... 53/317 |
| 7,207,538 | B2 | * | 4/2007 | Kent-Fawkes .......... 248/311.2 |
| 7,278,451 | B2 | * | 10/2007 | Cavallari ................ 141/83 |
| 2005/0268988 | A1 | * | 12/2005 | Cavallari ................ 141/177 |

FOREIGN PATENT DOCUMENTS

| BE | 857 107 A | 11/1977 |
| DE | 10 50 217 B | 2/1959 |
| DE | 295 01 941 | 5/1995 |

* cited by examiner

*Primary Examiner*—Gregory L Huson
*Assistant Examiner*—Nicolas A Arnett
(74) *Attorney, Agent, or Firm*—William J. Sapone; Coleman Sudol Sapone P.C.

(57) ABSTRACT

In a support device for bottles processed on a bottle filling and closing machine, a substantially elongated body has a bayonet coupling at a bottom part for connecting the device to a rotary conveyor of the machine. An upper lateral portion of the body has gripping wings, for receiving resiliently a bottle, introduced between the wings by pushing the bottle at a matching point between an auger conveyor for conveying the bottles and the rotary conveyor.

6 Claims, 4 Drawing Sheets

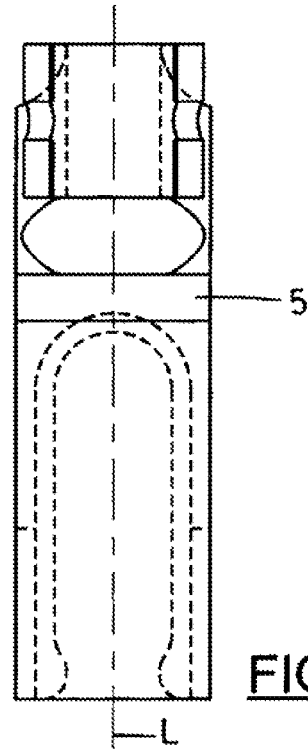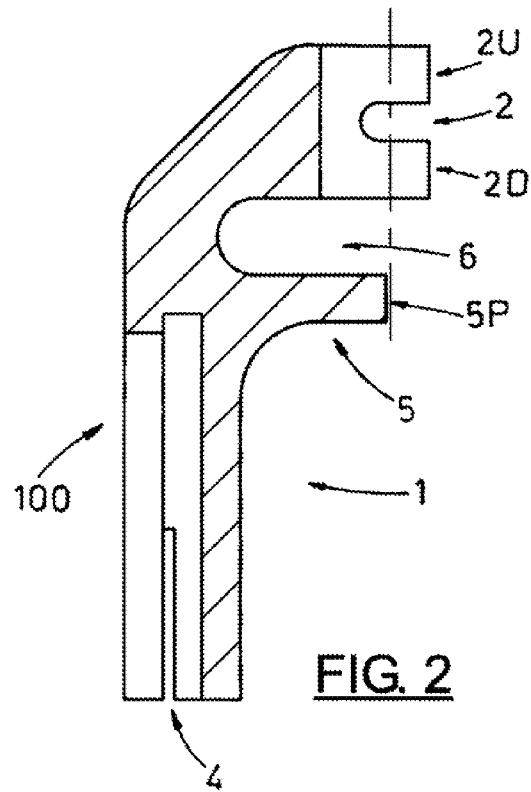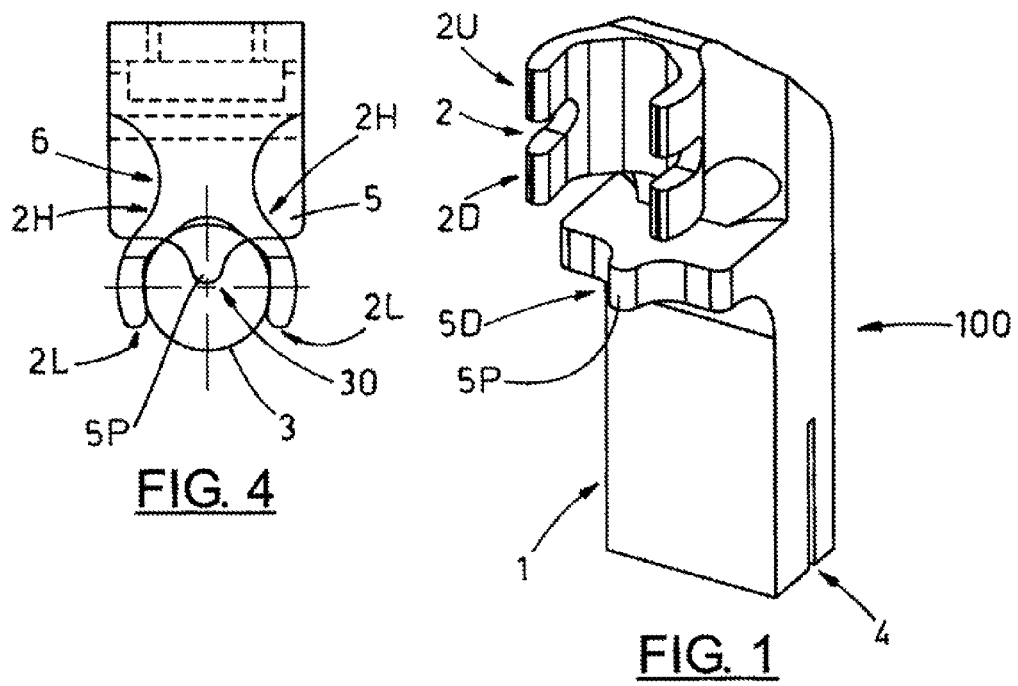

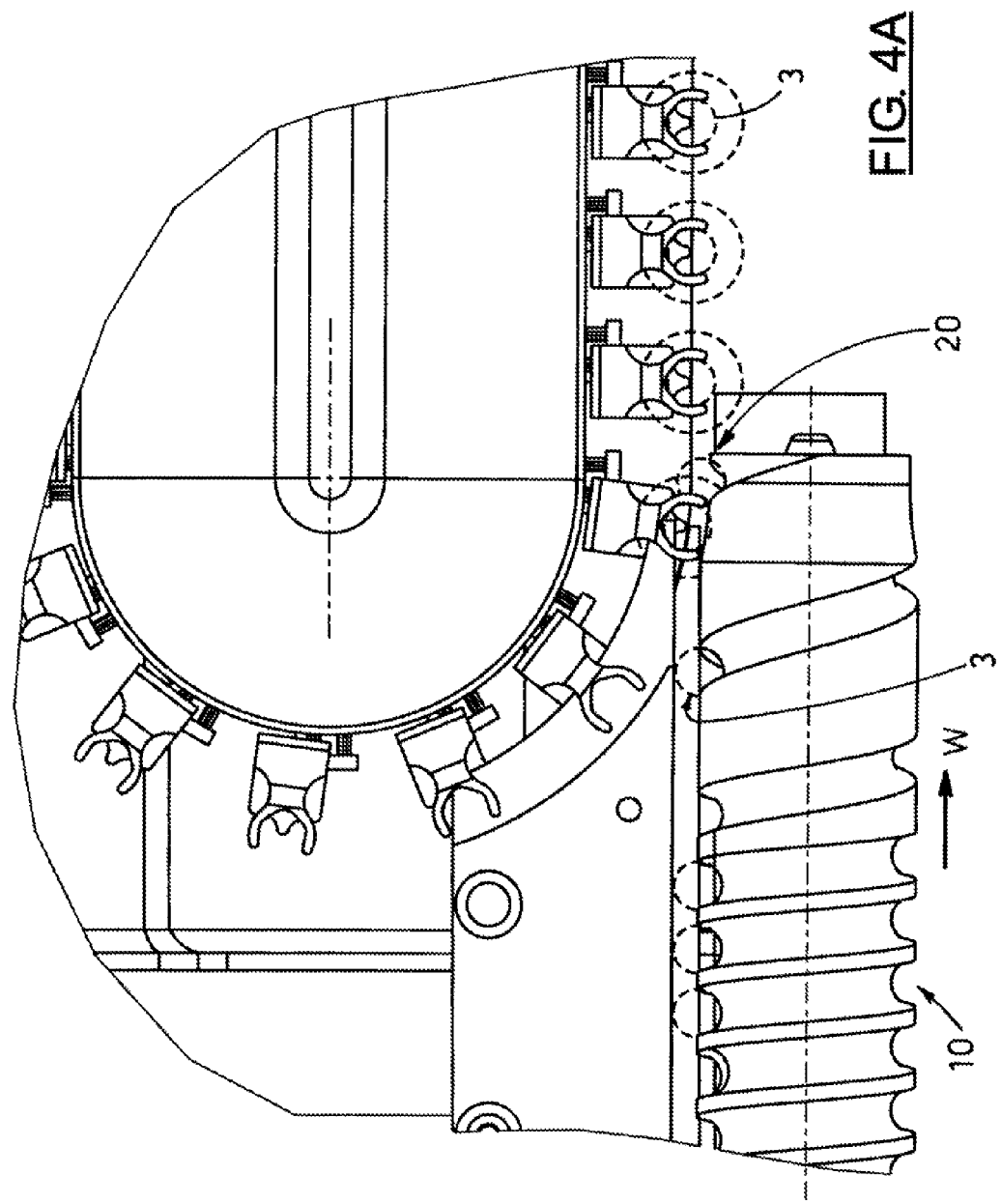

DEVICE FOR SUPPORTING BOTTLES

BACKGROUND OF THE INVENTION

The present invention relates to a device for supporting bottles in a machine for processing the bottles, for instance for filling and then closing the bottles.

DESCRIPTION OF THE PRIOR ART

Currently known machines for filling bottles have suitable means for gripping and supporting bottles, e.g. during filling and/or closing.

The gripping means usually include pliers or forks, which are aimed at coupling removably with the upper portion of a bottle, e.g. the neck, so as to support it during various work steps.

This technical solution, characterized by the coupling between the pliers (or the fork) and the upper end of the bottle, cannot ensure a firm gripping of the bottle.

Therefore, during the work steps, the bottle can be oscillated or displaced, which could prevent correct filling and/or closing.

SUMMARY OF THE INVENTION

The object of the present invention is to propose a device for reliably and efficiently supporting bottles.

A further object of the present invention is to propose a device, whose structure allows its easy and rapid cleaning and/or sanitation/sterilization.

Another object of the present invention is to propose an extremely functional and reliable device, of moderate cost, which ensures its easy and rapid installation and maintenance.

The above mentioned objects are obtained, in accordance with the contents of the claims, by a support device for a bottle processing machine, the device including: a substantially elongated body with connecting means for connecting the device to means for moving the support device on said machine; gripping means provided at an upper lateral portion of said body for receiving removably at least a portion of a bottle, due to a prefixed push exerted by the gripping means on said bottle and to a consequent elastic deformation of the gripping means.

BRIEF DESCRIPTION OF THE DRAWINGS

The characteristic features of the invention are pointed out in the following description of a preferred but not exclusive embodiment, with reference to the enclosed figures, in which:

FIG. 1 is a perspective view of the proposed support device;

FIGS. 2, 3 and 4 are respectively, a lateral section, a front and a top view of the proposed device;

FIG. 4A is a schematic, top view, in a scale reduced with respect to the previous Figures, of the proposed device associated to a machine for filling and closing bottles;

DISCLOSURE OF THE PREFERRED EMBODIMENT

Figure 5:
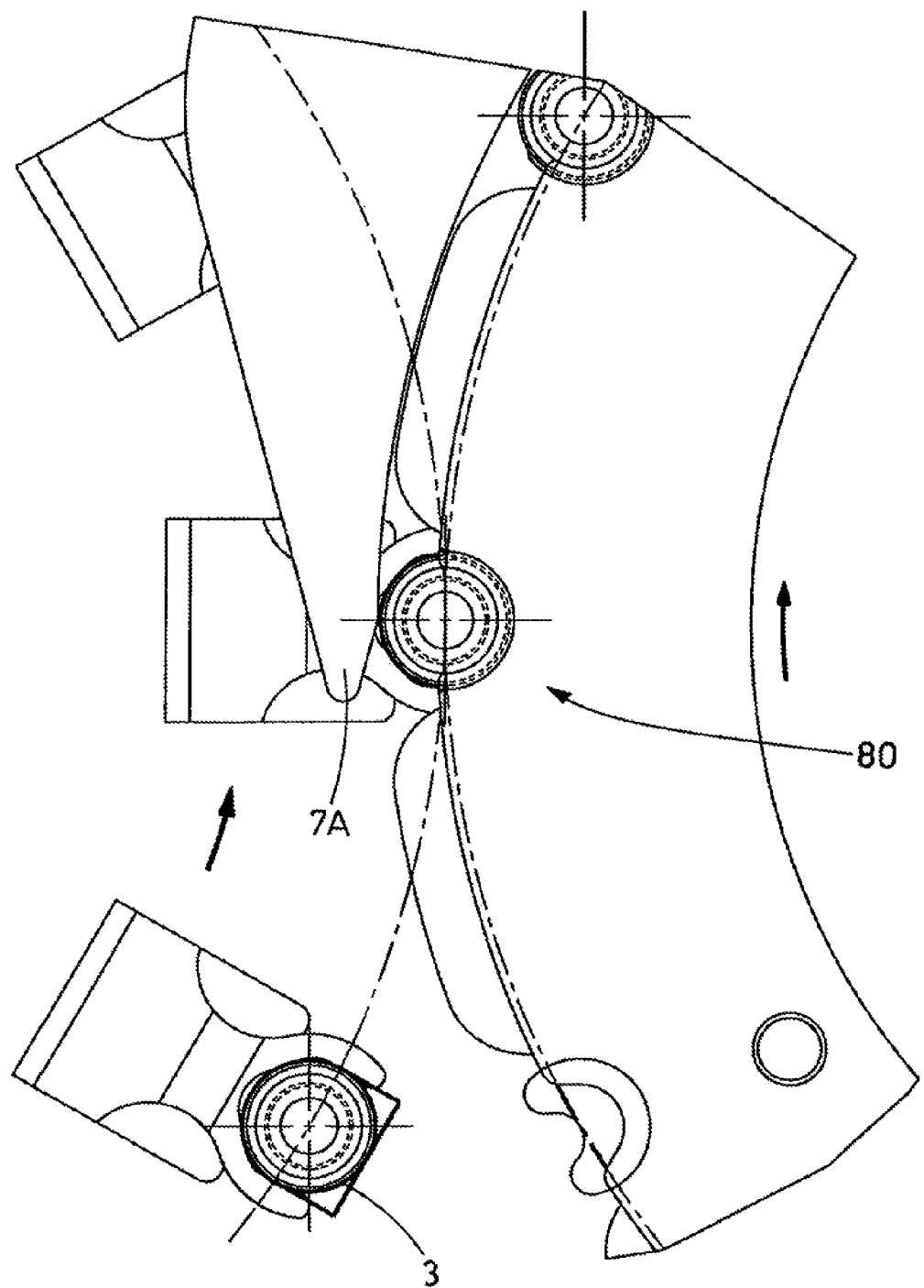
FIG. 5 is a schematic, top view of a portion of the machine of the previous Figure, referred to a station, in which the bottle is released from the device.

Having Regard to FIGS. 1, 2, 3, 4, the reference numeral 100 indicates a device for supporting bottles, which includes an elongated body 1, whose lower part has connecting means 4, which allow to join removably the device 100 to a corresponding seat made in a carrousel of a machine for processing bottles, e.g. for filling bottles 3 (see FIG. 4A), discussed later.

The connecting means 4 include preferably a bayonet coupling (FIG. 1) and the carrousel includes a plurality of equidistant seats, each of which receives a respective device 100.

The upper part of the body 1 features two pairs of wings 2, respectively upper wings 2U and lower wings 2D, extending from a same side of the body 1 and aimed at snap receiving at least a portion of a bottle 3.

The wings 2U, 2D of each pair of wings face each other and are symmetric with respect to a longitudinal plane L of the body 1.

The wings 2U, 2D of each pair of wings have facing surfaces convergent in their extension to the free terminal portions 2L. At their inner portions 2H, close to the body 1, the wings 2U, 2D have instead divergent facing surfaces. The divergent surfaces are connected to the convergent surfaces by curved sections.

The central part of the body 1 features a protrusion 5, extending to the same side as the wings 2 and having a tapered distal end 5D, so as to define a projection 5P.

The body 1 has a recess 6, made in the area between the protrusion 5 and the lower part of the lower wings 2D, and oriented in the same direction as the wings 2U, 2D are turned.

FIG. 4A shows a portion of the above mentioned machine for filling bottles 3 e.g. having an Auger conveyor 10 with a differentiated pitch, which feeds the bottles 3 (for example coming from a washing station, situated upstream) in a direction W, so as to convey them toward a gripping station 20 of the same machine.

Each device 100, associated to the carrousel, is moved toward the gripping station 20 in step relation with the motion of the bottles 3 fed by the screw 10.

At the gripping station 20, each bottle 3 is pushed by the conveyor 10 against the opposite surfaces of the wings 2U, 2D of the device 100 just arriving at the station.

Due to this pushing, the wings 2U, 2D of each pair first move away from each other, being deformed elastically, until they reach a maximum mutual distance and, due to the insertion of the bottle 3 therebetween, the wings 2U, 2D move back close to each other, holding the bottle 3 therebetween.

When the grip is completed, the wings 2U, 2D receive firmly and removably therebetween a portion of the bottle 3.

In particular, the wings 2U, 2D hold a portion of the outer surface of the bottle 3, which touches corresponding portions of the opposite surfaces of the wings 2U, 2D.

The stability of the grip of the wings 2U, 2D on the bottle 3 is ensured by the fact that the latter can be released only after a further elastic deformation imposed to the wings 2U, 2D.

When the bottle 3 is held between the wings 2U, 2D, possible downward pushes, to which the bottle 3 can be subjected along its axis, are limited by the presence of the projection 5P, whose upper surface receives in abutment the bottom of the bottle 3, so as to form a kind of axial reference for the bottle 3 positioning.

The machine has first disengaging means 7B and second disengaging means 7A, preferably formed by as many wedge profiles (FIGS. 5, 6) and situated downstream of the gripping station 20.

In particular, the first disengaging means 7B are placed at such a level as to work in the area included between the protrusion 5 and the lower portion of the lower wings 2D, while the second disengaging means 7A are placed at a higher level with respect to the upper wings 2U.

The bottle 3 is disengaged from the wings 2U, 2D in the following way: after the motion imposed by the carrousel to each device 100, the first disengaging means 7B enter the recess 6 and goes in contact with the lower portion of the bottle 3; at the same time, the second disengaging means 7A abut against the portion of the same bottle 3 protruding from the upper part of the pair of upper wings 2U.

The above operations cause a new elastic deformation of the wings 2U, 2D and the consequent release of the bottle 3.

Figure 6:
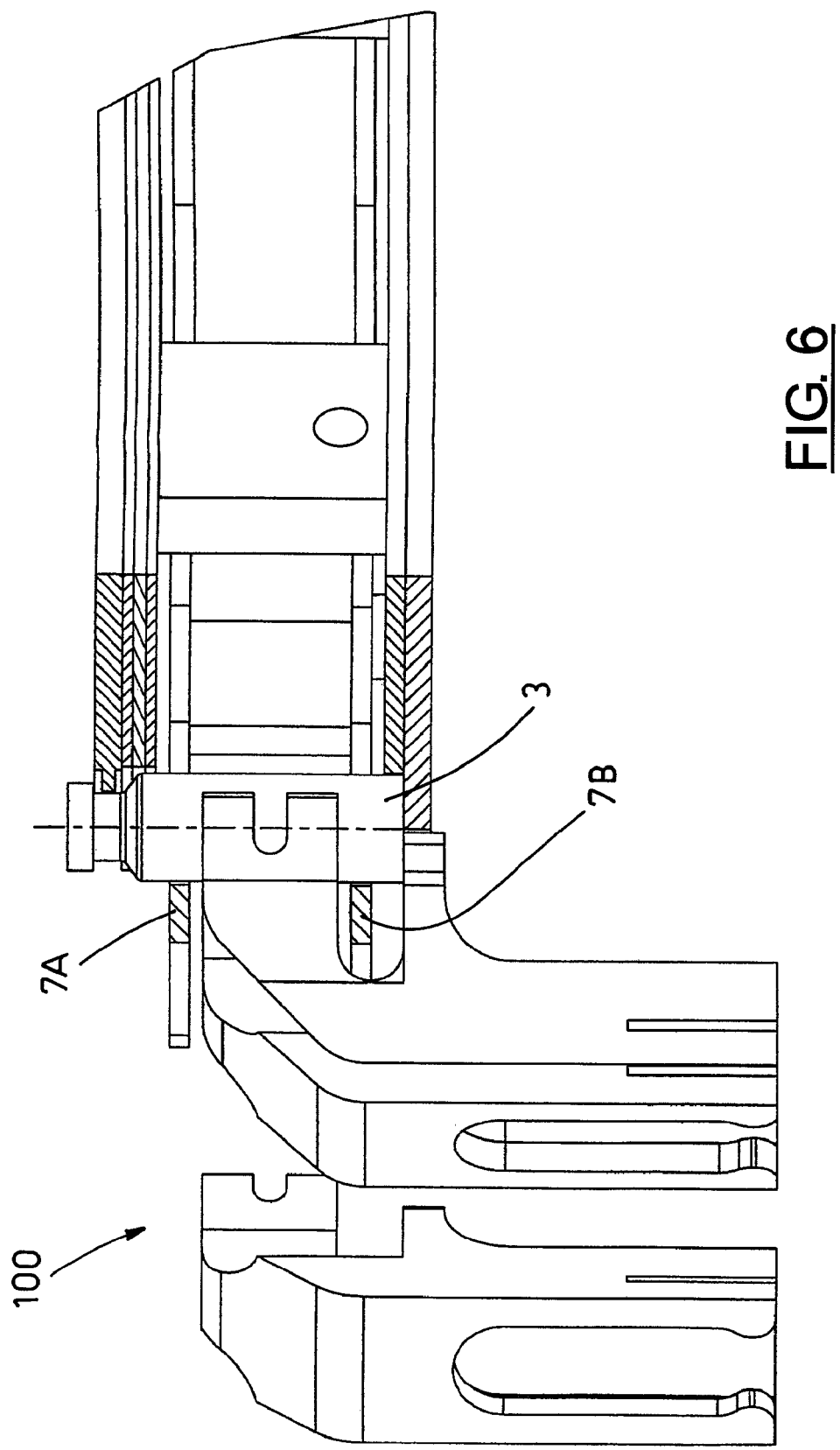
FIG. 6 is a schematic, lateral, partially section view, enlarged with respect to the previous Figure, of the station of FIG. 5.

In particular, during the disengagement of each bottle 3 from the wings 2U, 2D, the relevant device 100 faces gripping means 80, e.g. situated on a second carrousel, to which the disengaging means 7A, 7B convey the bottle 3 (FIGS. 5, 6).

The gripping means 80 are moved in step relation with the operation of the carrousel mentioned previously and their upper part has a profile which embraces at least partially the upper portion of the bottle 3, so as to hold the latter, once it has been disengaged from the wings 2U, 2D.

The lower part of the gripping means 80 forms a protrusion, whose shape is complementary to the projection 5P.

It is obvious that the use of bottles 3 having a different outer diameter requires substitution of the device 100 with a corresponding one having wings 2U, 2D of suitable dimensions.

Analogous considerations are valid for the bottles 3 height: also in this case, the device 100 must be substituted with a corresponding one, which allows to keep the upper edge of each bottle 3 at a prefixed height, so as to carry out correctly the subsequent closing step.

It is understood from the above explanation that the particular conformation of the proposed device for supporting bottles, and in particular the presence of the two pairs of wings 2U, 2D, which can be deformed elastically, can assure easy and rapid gripping/disengagement of the bottles 3.

Advantageously, the conformation of the proposed support device ensures a reliable and efficient rest for the bottles 3.

Moreover, the presence of the protrusion 5 prevents the downward axial sliding of the bottles 3 and thus it ensures the axial stability of the bottles during their filling and/or closing.

It is also to be pointed out that the presence of the recess 6, receiving a portion of the disengaging means 7B, allows an easy and rapid disengagement of the bottles 3 from the corresponding support device 100.

Advantageously, the bayonet coupling of the proposed device 100, allows the latter to be removed and placed on the machine rapidly and easily, thus facilitating and speeding up its substitution in case the bottles 3 of different dimensions are used, or for the device sanitizing.

Finally, another advantage derives from the fact that the device 100 is shaped in such a way, as to allow an easy and rapid cleaning, sanitizing or sterilization.

It is understood that the proposed invention has been described, with reference to the enclosed figures, as a mere, not limiting example. Therefore, it is obvious that any changes or variants applied thereto remain within the protective scope defined by the following claims.

What is claimed is:

1. A support device for a bottle processing machine, the device including:
    a substantially elongated body with connecting means for connecting the device to means for moving the support device on said machine;
    gripping means provided at an upper lateral portion of said body for receiving removably at least a portion of a bottle, due to a prefixed push exerted by the gripping means on said bottle and to a consequent elastic deformation of the gripping means,
    wherein said gripping means include at least a pair of opposite wings, symmetrical with respect to a longitudinal plane of the body and extending sidewise with respect to the body, and,
    wherein a central part of said body has a protrusion, extending from a same side as said pair of wings and having a tapered end, so as to define a projection having an upper surface for receiving in abutment a lower part of said bottle to limit sliding of the bottle, a recess included between said protrusion and lower surfaces of said pair of the wings,
    first disengaging means connected to a fixed support, entering said recess for contacting a portion of said bottle, so as to disengage the bottle from said pair of wings, in cooperation with second disengaging means, connected to said fixed support and getting in contact with a portion of the bottle protruding from upper surfaces of said pair of wings.

2. A device, according to claim 1, wherein said wings have facing surfaces convergent toward free terminal portions, whereas inner portions, close to the body, of said wings have divergent facing surfaces connected to said convergent surfaces by curved sections.

3. A device, according to claim 1, wherein due to said push, said wings are capable of moving away from each other to reach a maximum distance configuration, and after partial engagement of the bottle, said wings move close to each other, thus holding said bottle.

4. A device, according to claim 1, wherein said recess is oriented in a same direction as said pair of wings.

5. A device, according to claim 1, wherein said first disengaging means and said second disengaging means include respective wedge profiles.

6. A device, according to claim 1, wherein said connecting means include a bayonet coupling.

* * * * *